US 7,404,836 B2

(12) United States Patent
Garikipati et al.

(10) Patent No.: US 7,404,836 B2
(45) Date of Patent: Jul. 29, 2008

(54) FOCUSED FLOW FILTER

(75) Inventors: Vijay K. Garikipati, Eagan, MN (US);
Katsushi Isogawa, Eagan, MN (US);
Stanley B. Miller, Eden Prairie, MN
(US); Carl Soldner, Apple Valley, MN
(US)

(73) Assignee: Donaldson Company, Inc.,
Minneapolis, MN (US)

( * ) Notice: Subject to any disclaimer, the term of this patent is extended or adjusted under 35 U.S.C. 154(b) by 352 days.

(21) Appl. No.: 10/843,215

(22) Filed: May 11, 2004

(65) Prior Publication Data

US 2004/0261378 A1    Dec. 30, 2004

Related U.S. Application Data

(60) Provisional application No. 60/519,475, filed on May 12, 2003.

(51) Int. Cl.
*G11B 17/02* (2006.01)
*B01D 53/04* (2006.01)

(52) U.S. Cl. .................. 55/385.6; 96/134; 96/140; 96/142; 360/97.02; 360/97.03

(58) Field of Classification Search .................. 96/134, 96/140, 142, 139, 147, 152, 153, 135; 55/385.6, 55/502, 519; 360/97.02, 97.03, 97.01
See application file for complete search history.

(56) References Cited

U.S. PATENT DOCUMENTS 4,268,878 A * 5/1981 Kearns .................... 360/97.02

4,329,722 A * 5/1982 West .................... 360/97.03
4,367,502 A   1/1983 Iftikar et al.
4,471,395 A * 9/1984 Beck et al. ............... 360/98.04
4,710,830 A * 12/1987 Imai et al. ................ 360/97.03

(Continued)

FOREIGN PATENT DOCUMENTS

JP        62-175987        8/1987

OTHER PUBLICATIONS

"Combined Inertia and Recirculating Filter," *IBM Technical Disclosure Bulletin*, vol. 32, No. 8A, pp. 294-295 (Jan. 1990).

*Primary Examiner*—Duane Smith
*Assistant Examiner*—Minh-Chau T. Pham
(74) *Attorney, Agent, or Firm*—Pauly, Devries Smith & Deffner, LLC

(57) ABSTRACT

A filter assembly for use in a disk drive assembly is disclosed. The filter assembly is configured to remove contaminants within the drive assembly and to prevent entry of contaminants into the drive assembly. In one implementation the filter assembly includes a housing configured for placement in a disk drive assembly containing a rotating disk, the housing including an air scoop having an entrance configured for placement beneath the rotating disk in the drive assembly; and a major surface having a wall and an opening in the wall, the opening configured for receiving a filter material and being in fluid communication with the entrance to the air scoop. A filter element is positioned within the housing and configured so that a first portion of the element filters air directed from the air scoop, while a second portion of the element filters air from the exterior of the drive assembly, the first and second portions sealed by a common filter material placed over the opening in the major surface.

9 Claims, 2 Drawing Sheets

U.S. PATENT DOCUMENTS

| | | | |
|---|---|---|---|
| 4,857,087 A * | 8/1989 | Bolton et al. | 55/385.6 |
| 4,863,499 A * | 9/1989 | Osendorf | 96/134 |
| 4,888,655 A * | 12/1989 | Bonn | 360/97.03 |
| 5,030,260 A * | 7/1991 | Beck et al. | 96/139 |
| 5,307,222 A * | 4/1994 | Dion | 360/97.02 |
| 5,406,431 A * | 4/1995 | Beecroft | 360/97.02 |
| 5,447,695 A * | 9/1995 | Brown et al. | 422/171 |
| 5,876,487 A * | 3/1999 | Dahlgren et al. | 96/13 |
| 5,997,614 A * | 12/1999 | Tuma et al. | 96/4 |
| 6,146,446 A * | 11/2000 | Tuma et al. | 95/90 |
| 6,168,651 B1 * | 1/2001 | Tuma et al. | 95/90 |
| 6,208,484 B1 * | 3/2001 | Voights | 360/97.02 |
| 6,238,467 B1 * | 5/2001 | Azarian et al. | 96/135 |
| 6,266,208 B1 * | 7/2001 | Voights | 360/97.02 |
| 6,395,073 B1 * | 5/2002 | Dauber | 96/134 |
| 6,475,269 B1 * | 11/2002 | Turner | 96/134 |
| 6,557,240 B1 | 5/2003 | Voights | |
| 6,709,498 B2 * | 3/2004 | Tuma | 96/134 |
| 7,012,781 B2 * | 3/2006 | Chee et al. | 360/97.01 |
| 2005/0047001 A1 * | 3/2005 | Logan | 360/97.02 |

* cited by examiner

FOCUSED FLOW FILTER

REFERENCE TO PRIORITY APPLICATION

This application claims the benefit of provisional application 60/519,475 filed May 12, 2003 entitled FOCUSED FLOW FILTER.

FIELD OF THE INVENTION

The present invention relates to filters and to methods for making and using filters. More particularly, the invention is directed to filters for use in preventing contamination from entering electronic enclosures and for use in removing contamination from within electronic enclosures.

BACKGROUND OF THE INVENTION

Hard disk drives and other electronic equipment are often sealed within electronic enclosures to provide a clean environment that is necessary for optimal operation of the equipment. For example, hard disk drives normally contain at least one inflexible platter or disk coated with magnetic material that is positioned within an enclosure. The hard disk is rapidly spun within the enclosure and a magnetic read/write head "flies" a few microns above it in order to access or store data. The magnetic head rides on an air cushion, and it is desirable to position the head as close as possible to the disk without touching it in order to provide a high capacity drive.

Contaminants, including particles, gases, and liquids within the hard disk drive enclosure can act to reduce the efficiency and longevity of the hard drive. These contaminants can gradually damage the drive, cause deterioration in performance, and in certain situations can even cause sudden, complete failure of it. Contaminants can either enter the electronic enclosure from an external source or be generated from within the enclosure during use. Common sources of contaminants in disk drives include leaks, which may or may not be intentional, the manufacturing environment, which can contain certain contaminants, and the materials incorporated into the disk drive which give off particulates and gases.

One particular concern regarding electronic enclosures is that contaminants from outside of the electronic enclosure should be prevented from entering the enclosure. These contaminants can be of particular significance because temperature fluctuations in the enclosure will often cause the exchange of air with the exterior environment. If particulate or chemical contaminants are present in this exchanged air, the interior of the enclosure will become contaminated. Another particular concern regarding electronic enclosures is that organic vapors and other contaminants can be generated inside electronic enclosures during normal operating conditions. For example, when the temperature exceeds 150° F., organic acids and organic vapors can be formed that damage electronic components. Such temperatures can be achieved by simply leaving the computer in the trunk of a car on a hot day. It is important that these contaminants generated within the enclosure be efficiently captured or removed in order to prevent deterioration of the electronic equipment.

Therefore, a need exists for a filter for use in an electronic enclosure, in particular a filter that prevents contaminants from entering the enclosure and also removes contaminants that are present within the enclosure.

SUMMARY OF THE INVENTION

The present invention is directed to an improved filter for preventing contaminants from entering the interior of a disk drive enclosure, as well as for removing contaminants from within a disk drive enclosure. The first function, that of preventing the entrance of contaminants, is referred to herein as a breather function, reflecting the fact that air often enters and leaves the drive enclosure as the drive heats, cools, and is exposed to differing environmental conditions. The second function, that of removing contaminants from within a disk drive enclosure, is referred to herein as a recirculation function, reflecting the fact that the air within the drive is recirculated through the filter element repeatedly during operation.

The present invention includes a number of specific aspects. In a first aspect, certain embodiments of the invention utilize a housing that directs air flowing beneath or adjacent to the rotating disks, this air being directed through a filter element. In another aspect, the filter assemblies made in accordance with the present invention contain a breather element configured to prevent contaminants from entering the drive enclosure. In certain implementations of the invention a common filter element performs both breather and recirculation functions by being positioned within the housing such that it can filter air circulating through the drive enclosure while also filtering air as it enters the enclosure.

The above summary of the present invention is not intended to describe each discussed embodiment of the present invention. This is the purpose of the figures and the detailed description that follows.

BRIEF DESCRIPTION OF THE DRAWINGS

The invention may be more completely understood in connection with the following drawings, in which.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

The present invention is directed to an improved filter apparatus for use in hard disk drive enclosures, as well as other electronic devices. However, the invention is particularly well suited for devices having significant airflow within the enclosure, such as the airflow generated from a rotating disk within a hard disk drive. In certain embodiments of the invention the filter apparatus includes both a recirculation element and a breather element, and both elements can be constructed such that they are integrally formed with one another.

Figure 1A:
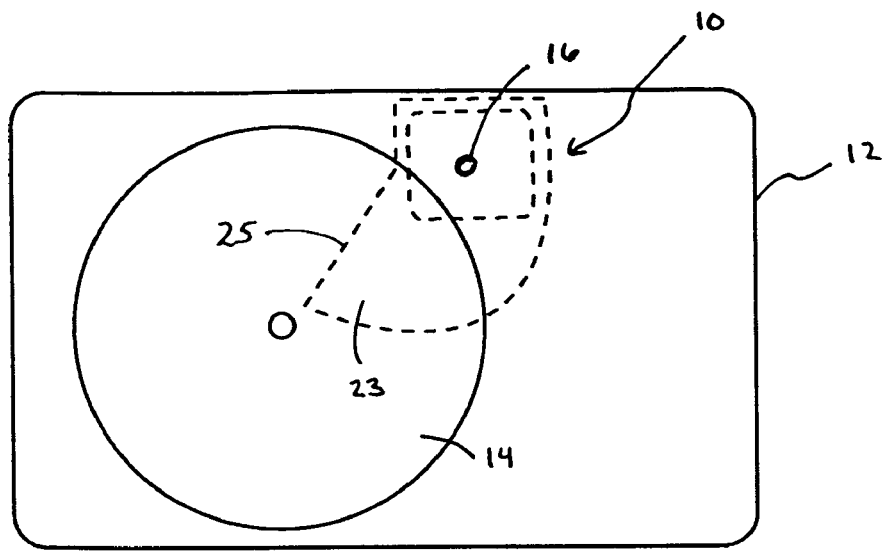
FIG. 1A is a simplified plan view of a filter assembly installed in a hard disk drive enclosure.

The invention is now described in detail with reference to the drawings, wherein like reference numerals represent like parts and assemblies throughout the several views. Referring to FIG. 1A, a filter assembly 10 (shown in dashed lines) made according to an implementation the present invention is depicted. Filter assembly 10 is shown positioned in close proximity to a simplified hard disk 14 within a hard disk drive enclosure 12. Although filter assembly 10 is shown in use inside a hard disk drive enclosure 12, filter assembly 10 can be used in numerous types of electronic equipment, for example, computers, video cameras, digital cameras, compact disc (CD) players, DVD players, and the like. Filter assembly 10 can also be used with other electronic equipment and/or in other applications, and is generally best suited to use in enclosures having a moving air stream.

Filter assembly 10 aids in the removal of contaminants from a fluid stream. It should be appreciated that in the context of this invention the reference to the "reduction" or "removal" of contaminants refers to the clarification of a fluid stream (e.g., gas or liquid stream) being filtered. The stream being clarified in a hard disk drive enclosure is typically an air stream. Streams of other gases or liquids could also be clarified by the filter assembly of the present invention. The reduction or removal of contaminants from a liquid or gas stream by a filter assembly can also be referred to as entrapment, immobilization, adsorption, absorption, or otherwise binding (e.g., by covalent, ionic, coordinative, hydrogen, or Van der Waals bonds, or combinations thereof) of the contaminants inside or on the surface of the filter assembly.

Filter assembly 10 is designed to reduce contaminants within enclosure 12 by multiple processes or procedures. A first procedure for reducing, removing, or preventing contamination within enclosure 12 is to reduce or remove any contaminants entering enclosure 12 from regions outside of enclosure 12 (or other device). A second procedure for reducing, removing or preventing contamination from within enclosure 12 is to reduce or remove contaminants present in the enclosure atmosphere.

Referring again to FIG. 1A, hard disk drive enclosure 12 has disk 14 positioned at one end. A stream of air and gases is caused to flow or circulate in the same direction as disk 14 rotates, and a portion of this air is directed through filter assembly 10 to perform a recirculation filter function. In addition, enclosure 12 includes a port 16 (shown in dotted lines) that provides fluid communication (i.e., airflow) from the exterior atmosphere into drive enclosure 12 after being filtered by filter assembly 10. Air from the exterior is pulled into enclosure 12 by the pressure differential between the interior and exterior of the enclosure. An equal amount of air generally exits enclosure 12 through cracks and seams in enclosure 12 so that the volume of air within enclosure 12 is constant.

Figure 1B:
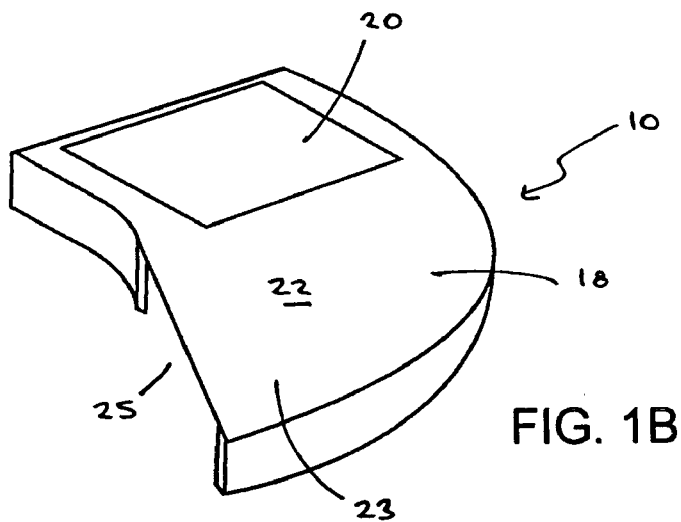
FIG. 1B is a top perspective view of a filter assembly constructed and arranged in accordance with the invention, showing filter media secured to a filter housing.
Figure 1C:
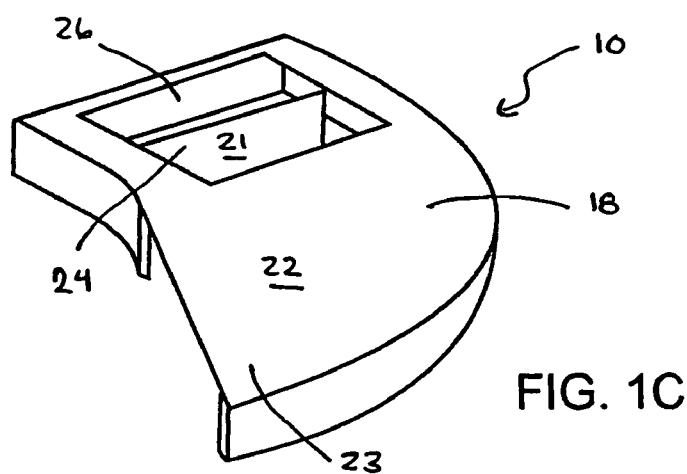
FIG. 1C is a top perspective view of the housing of the filter assembly of FIG. 1B, showing the housing without filter media.

In FIG. 1B, the filter assembly 10 is shown in greater detail, and includes filter housing 18 containing filter media 20 positioned on the top surface 22 of the housing 18. Filter housing 18 is typically made from a moldable polymeric material, such as polypropylene, polyethylene, polycarbonate, and the like. In certain embodiments of the invention the filter media 20 provides both recirculation and breather functionality, thereby performing two functions with a single filter element. In FIG. 1C the filter media of FIG. 1B has been removed to reveal additional features of housing 18, in particular two openings 24, 26 in the housing 18. First opening 24 allows air to pass through the filter media to function as a recirculation filter, while second opening 26 is positioned in fluid communication with the exterior of the drive by way of port 16 (not shown in FIG. 1C), thereby functioning as a breather filter. A divider 21 separates cavities beneath openings 24 and 26 from one another. In some implementations filter media 20 is a continuous covering across the two openings 24, 26, but in other implementations the filter media is differentiated between the two openings 24, 26 so as to provide tailored functions to each filtering objective.

Air rotating in the enclosure 10 is directed by a scoop 23 in housing 18. The scoop 23, shown in both FIGS. 1B and 1C, includes an opening 25 that is typically placed beneath (or above) a rotating disk such that the opening is generally perpendicular to the direction of air flowing beneath the disk. In this manner the scoop 23 serves to direct increased airflow through the filter media 20. The scoop 23 aids in directing increased airflow through the filter media 20, and in particular the portion of the filter media covered by opening 24. Scoop 23 typically has a minimum of obstructions so as to ensure that airflow through the filter is not excessively restricted.

Figure 2:
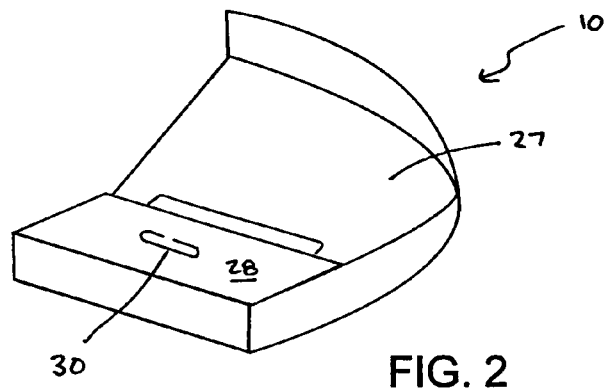
FIG. 2 is a bottom perspective view of the filter assembly of FIGS. 1B and 1C.

Referring now to FIG. 2, the bottom side 27 of the filter assembly 10 is depicted, and contains a bottom surface 28 configured for being adhesive, thereby allowing filter assembly 10 to be easily placed and secured to an appropriate location within a drive enclosure. FIG. 2 also shows a small diffusion channel 30 formed in the bottom surface 28 of the housing 18. This diffusion channel 30 provides a contaminant gradient between the interior and the exterior of the filter. Diffusion channel 30 provides an extended length of passage (a tortuous path) between an inlet and an outlet compressed into a small space. This tortuous passage can be configured, for example, as an inwardly spiraling channel, an outwardly spiraling channel, or as a maze-like configuration. Diffusion channel 30 provides a plenum that allows air to flow from the inlet to the outlet displaced from the inlet. Specifically, diffusion channel 30 allows slow diffusion of gases into and out of enclosure 12; the rate of diffusion is largely dependent on the concentration gradient along the length of diffusion channel. The inlet of the diffusion channel 30 is positioned over or in close proximity to port 16 in enclosure 12.

The diffusion channel can be made from a single plastic piece with a tortuous channel carved or molded in the surface thereof, so that the channel is open to the atmosphere. The molded surface having the channel therein is then sealed with an impermeable membrane or film, such as MYLAR (polyester film), to seal the diffusion channel so that a set number of outlets are present. In another embodiment, the channel is positioned against another surface, such as an inner surface of disk drive enclosure 12; the surface seals the diffusion channel so that the desired number of outlets is present. In many embodiments, there is only one outlet from the diffusion channel. An example of a diffusion channel for use with computer disk drive systems is described in U.S. Pat. No. 4,863,499 (Osendort).

Figure 3A:
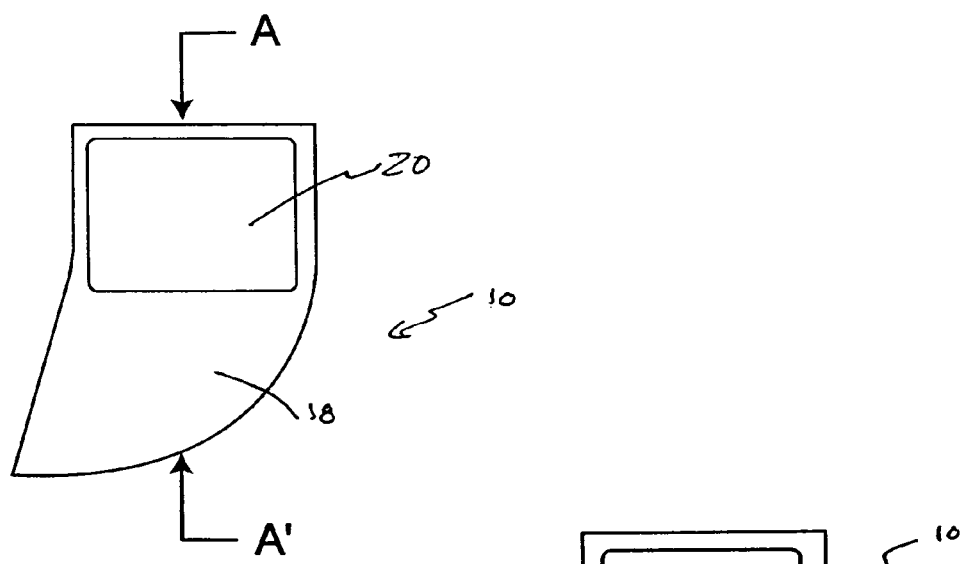
FIG. 3A is a top plan view of the filter assembly of FIG. 1B, showing the filter housing with filter media secured to the housing.
Figure 3B:
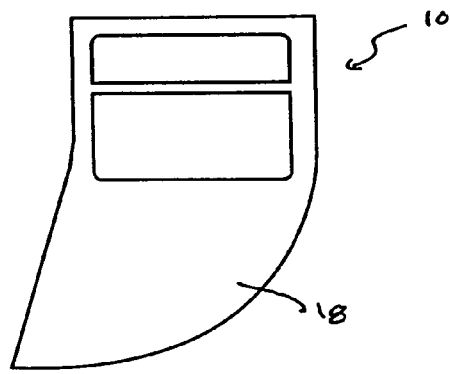
FIG. 3B is a top plan view of the filter housing of FIG. 1C, showing the housing without filter media.

FIGS. 3A and 3B show top plan views of the filter assembly 10 shown in FIGS. 1A, 1B, and 2. FIG. 3 shows the top plan view in which the housing 18 has filter media 20 present along a portion of its upper surface. FIG. 3B shows the same filter assembly but without to filter media to reveal the two openings 24, 26 in the housing, each corresponding to either the recirculation or breather functionality of the filter.

Two alternative configurations for configuring and arranging the filter media include use of an adsorbent element, such as a tablet, within a first portion of the housing functioning as the breather filter, plus a particulate filter over both openings 24 and 26; or two pouch style filter elements, one over each of the two openings 24 and 26. The adsorbent element in the two embodiments is configured primarily for the removal of airborne chemical contaminants from air that passes in close proximity to that portion of filter assembly 10. The adsorbent element is designed to remove contaminants from the air entering the enclosure atmosphere by either adsorption or absorption. As used throughout this application, the terms "adsorb", "adsorption", "adsorbent" and the like, are intended to also include the mechanisms of absorption and adsorption. Typically, the adsorbent element is selected to be stable and adsorb contaminants within normal disk drive operating temperatures, for example, about 10° C. to 50° C.

The adsorbent element adsorbs one or more types of contaminants, including, for example, water, water vapor, acid gas, and volatile organic compounds from the internal air stream. The adsorbent element typically includes a physisorbent or chemisorbent material, such as, for example, a desiccant (i.e., a material that adsorbs or absorbs water or water vapor) or a material that adsorbs or absorbs volatile organic compounds, acid gas, or both. Suitable adsorbent materials include, for example, activated carbon, impregnated carbon, activated alumina, molecular sieves, silica gel, and silica. These materials can be combined with or impregnated with, for example, potassium permanganate, calcium carbonate, potassium carbonate, sodium carbonate, calcium sulfate, or mixtures thereof. Although the adsorbent element can be a single adsorbent material, mixtures of materials are also useful, for example, silica gel can be blended with activated carbon. In some embodiments, the adsorbent element includes layers or combinations of adsorbent material, so that different contaminants are selectively removed as they pass through the different adsorbent materials.

The adsorbent element can include a loose powder (for example, it passes through 100 mesh) or granular material (28 to 200 mesh). Alternately, the adsorbent element can be shaped into a unitary form, such as a granule, bead, or tablet that optionally can be further shaped. In at least some instances, a shaped adsorbent article substantially retains its shape during the normal or expected lifetime of the filter assembly. The shaped adsorbent article can be formed from a free-flowing particulate material combined with a solid or liquid binder that is then shaped into a non-free-flowing article. The shaped adsorbent article can be formed by, for example, molding, compression molding, or an extrusion process.

Specifically, in one embodiment, the adsorbent element of filter assembly 10 is a pouch-type element, which has an adsorbent material held within a structure such as housing 18. The structure can be a molded, cast, or otherwise shaped element. An air permeable membrane allows air flow to and through the adsorbent element retained within housing 18. In some embodiments, the air permeable membrane also has a filtering function. For example, the membrane can be a particulate or solid contaminant removal element. In one embodiment, air permeable membrane is a polytetrafluoroethylene (PTFE) membrane.

The recirculation element can be any particulate, chemical, or combination filter. In one embodiment, the recirculation element can be a type of "pillow filter" which is meant to describe its pillowy shape. The edges of the filter are sealed to keep the components of the filter from escaping. The recirculation element generally includes at least one organic vapor removal layer and at least one particulate removal layer. The organic vapor removal layer can provide permanent removal of certain organic vapor contaminants, and the particulate removal layer can provide permanent removal of certain particulate contaminants. It should be understood that "permanent removal" refers to the removal or entrapment of contaminants that are not released from the filter assembly during normal operating conditions for a particular application. In the case of the filter assembly 10, the permanent removal of certain particulate and vaporous contaminants from the environment inside disk drive enclosure 12 reflects the fact that those contaminants are not released into the stream of air during normal operating conditions. During conditions that are not normal, for example, when the temperature of the organic vapor removal layer is heated in excess of normal operating temperatures, organic vapors may be released from the organic vapor removal layer.

The organic vapor removal layer can, if desired, provide some degree of particulate contaminant removal. The particulate removal layers generally do not provide for permanent organic vapor removal because the materials that make up the particulate removal layers do not physically function to achieve permanent removal of organic vapor contaminants. Although organic vapors may attach to these layers, they can usually become released during the normal operation of the hard disk drive.

The recirculation element can also include scrim layers. The scrim layers are provided to keep the components of the recirculation element from escaping into the environment of disk drive enclosure 12. The scrim layers normally have a porosity that is sufficient to minimize pressure drop but, at the same time, contain the components of the recirculation element. If, for example, the particulate removal layers are made of a fibrous non-woven material, the scrim should be sufficient to keep the fibers from escaping. The scrim layers can be omitted from the filter if they are not needed to prevent components of the filter from escaping.

Advantageous layers in the recirculation element include those made of an electrostatic medium, or a polymer medium such as TEFLON (polytetrafluoroethylene). A suitable electrostatic medium, for example, is a mixed fiber medium of 50% polypropylene and 50% modacrylic that exhibits a permanent electrical potential, having a Fomblin Efficiency of 76-94% average with no single value below 71 or above 99 (test at 10.5 ft./min. airflow, 0.3-0.4 micron particles); permeability of 200-476 ft./min.; thickness of 0.036-0.061 inches; and basis weight equivalent to 30-150 gm/m.sup.2 (48-75 lbs./3000 ft..sup.2). An exemplary polymer medium is a TEFLON (polytetrafluoroethylene) fibrous membrane filter medium having a Fomblin Efficiency of 98.0% minimum (challenge solution is 50% Fomblin in Freon); a Frazier Permeability of 15.0 ft./min minimum average (all readings greater than 11.0 ft./min.); and a tensile strength of less than 7000 psi average over 5 samples.

The filter assembly 10 is held in the disk drive enclosure 12 by mechanical or adhesive techniques. For example, clips, a frame, or other structures can support the filter assembly in enclosure 12. Any supports can be provided around the filter and can be separable from the enclosure. If desired, filter assembly 10 can be welded to the frame or "fitted" in place. Pins can be used to secure filter assembly 10 to protrusions on or depressions in enclosure 12. As another mechanical engagement technique, a portion of the filter assembly can engage with a structure of enclosure 12. For example, a protrusion on filter assembly 10 can be adapted to fit within port 16 defined by enclosure 12. Double-sided tape or other adhesive means can be used as an adhesive attachment system, as can a carrier having an adhesive coated onto a surface.

In some embodiments it is preferred that the seal between the inner surface of enclosure 12 and filter assembly 10 is essentially airtight. An o-ring, gasket, or other seal can be provided to minimize any air entering enclosure 12 through port 16 and passing filter assembly without experiencing any filtering effects.

By having both first filtering portion and second filtering portion in the same filter assembly 10, various advantages are achieved. For example, costs are decreased when a single unit is used rather than two separate units; this decreases the cost associated with manufacturing the unit (one piece versus two pieces) and decreases the time and cost associated with assembly of the enclosure because only one unit needs to be placed within enclosure rather than two units. This is also beneficial when removing and replacing the filter assembly; only one unit needs to be removed and replaced rather than two separate units. Further, the space needed within enclosure to house the unit is less for one unit compared to two units. Additionally, the filtering capabilities of the two units may be improved when combined in a single filter assembly.

The above specification provides a complete description of the manufacture and use of the composition of the invention. Since many embodiments of the invention can be made without departing from the spirit and scope of the invention, the invention resides in the claims hereinafter appended.

We claim:

1. A filter assembly for use in an electronic enclosure, the filter assembly configured to remove contaminants within the electronic enclosure and to prevent entry of contaminants into the electronic enclosure, the filter assembly comprising:
   a housing, configured for placement in an electronic enclosure containing a rotating disk, the housing comprising:
      an air scoop configured to direct airflow through a filter material, the air scoop having an entrance configured for placement proximate to the rotating disk in the electronic enclosure; and
      a major surface comprising a wall having an opening configured for receiving a filter material and being in fluid communication with the entrance to the air scoop; and
   a filter element positioned within the housing and covering the opening in the major surface, the filter element having first and second portions, where the portion of the element is configured to filters air directed from the air scoop and the second portion of the element is configured to filters air from the exterior of the electronic enclosure.

2. The filter assembly of claim 1, wherein the housing defines a cavity configured to receive an adsorbent material, the cavity being in fluid communication with the entrance to the air scoop and with the opening in the wall of the major surface of the housing.

3. The filter assembly of claim 2, wherein the cavity is bisected by a divider to define a recirculation portion and a breather portion.

4. The filter assembly of claim 1, wherein the opening in the wall of the major surface of the housing is in fluid communication with the interior of the electronic enclosure.

5. The filter assembly of claim 1, wherein the opening in the wall of the major surface of the housing is integrally formed with the electronic enclosure.

6. A filter assembly for use in an electronic enclosure, the filter assembly comprising:
   (a) a housing defining an air inlet, an air scoop, an air outlet, and a channel connecting the air scoop with the air outlet, the air scoop being configured to direct airflow through a filter material; and
   (b) a dual purpose filter comprising:
      (i) a breather filter element positioned within the housing and in fluid communication with the air inlet and the air outlet, the breather filter element positioned to filter air entering the electronic assembly; and
      (ii) a recirculation filter element positioned over the air outlet to filter air circulating within the electronic enclosure.

7. The filter assembly of claim 6, wherein the dual purpose filter comprises at least one common layer between the breather filter element and the recirculation filter element.

8. The filter assembly of claim 6, wherein the housing comprises a major surface having a wall and an opening in the wall, the opening configured for receiving a filter material and being in fluid communication with the entrance to the air scoop.

9. The filter assembly of claim 8, wherein the opening in the wall of the major surface of the housing is exposed to the interior of the electronic enclosure.

* * * * *